United States Patent [19]
Pierce

[11] 3,945,251
[45] Mar. 23, 1976

[54] TRICHEL PULSE CORONA GAS VELOCITY INSTRUMENT

[75] Inventor: Edward T. Pierce, Menlo Park, Calif.

[73] Assignee: Stanford Research Institute, Menlo Park, Calif.

[22] Filed: Oct. 11, 1974

[21] Appl. No.: 514,111

[52] U.S. Cl. ............................................. 73/194 F
[51] Int. Cl.² ............................................. G01F 1/56
[58] Field of Search ....... 73/194 E, 194 F; 250/356; 324/33

[56] References Cited
UNITED STATES PATENTS 2,637,208  5/1953  Mellen ................................. 73/194

3,470,741  10/1969  Durbin ................................ 73/194

OTHER PUBLICATIONS

Werner et al., "Investigation of a Corona Discharge for Measurements in Air Flow, Air Force" Research Report No. 84, pp. 19, 20, 35, 59, 73. TL 574 F5MS p. VIII.

Primary Examiner—Herbert Goldstein
Attorney, Agent, or Firm—Urban H. Faubion

[57] ABSTRACT

Velocity of a gas (e.g., wind) is determined as a function of the pulse repetition frequency of corona discharge (Trichel) pulses from a discharge probe positioned in the gas stream.

2 Claims, 1 Drawing Figure

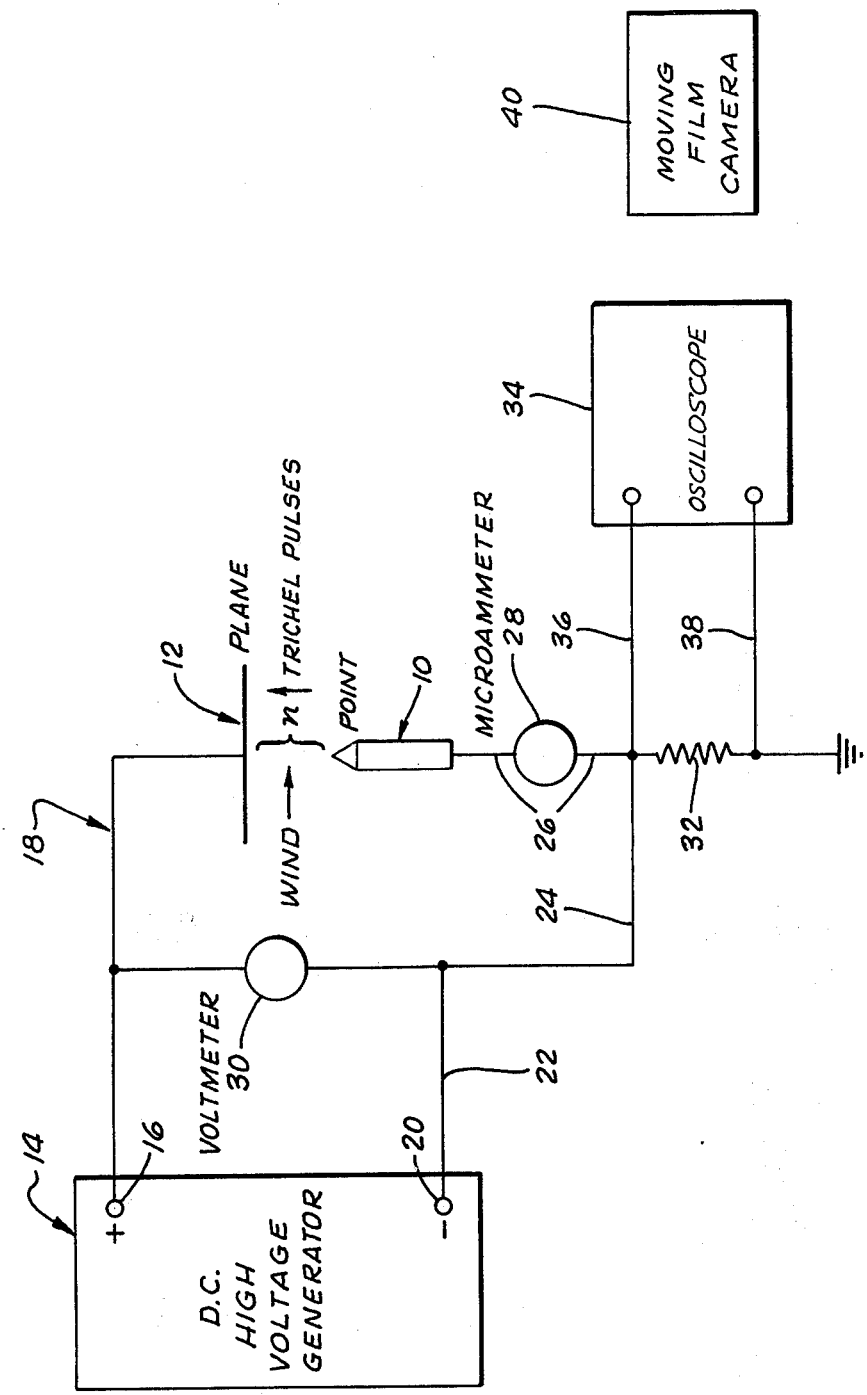

TRICHEL PULSE CORONA GAS VELOCITY INSTRUMENT

BACKGROUND OF INVENTION

Instruments to measure velocity of gases have been the subject of investigation for many years. A common method of measuring velocity of flow involves use of vanes which are rotated by the gas, much like the vanes of a windmill or those of a conventional anemometer. The speed of rotation of the vanes gives a measure of the velocity of the driving medium. Such devices produce an accurate measure of average gas velocity and therefore are highly practical and useful for many applications. Windmill type devices have relatively high inertia and therefore do not react fast enough to give an accurate indication of the velocity of the gas at any given time when the velocity is varying rapidly. Where it is important to know instantaneous velocity, therefore, devices which respond more rapidly (have less inertia) are required.

The attempt to improve overall performance of the windmill type of meters resulted in the hot wire meters, such as the hot wire anemometer for wind, wherein an electric current is passed through a fine conductive wire and the wire is subjected to the flowing gas. Changes in velocity of the gas passing the wire modify the rate of heat transfer between the wire and the gas, thus affecting resistivity of the wire. Thus, changes in velocity of the surrounding fluid result in changes in temperature and, consequently, resistance of the wire which provide an indication of velocity. The hot wire meter or instrument does, in fact, represent a significant improvement over the earlier windmill type but still has disadvantages, one of which is a certain amount of inertia. A discussion of hot wire anemometry and a bibliography on the subject is found in Mark V. Morkovin, "Fluctuations and Hot-Wire Anemometry in Compressible Flows" (North Atlantic Treaty Organization, Advisory Group for Aeronautical Research and Development, AGARDograph No. 24, November 1956).

Another refinement is represented by the corona discharge anemometer, wherein a high voltage is applied to a sharp point exposed to the atmosphere. The discharge or corona current from the point depends upon the wind velocity at the point. The current is measured and used as an indication of wind speed.

The present invention is an improvement over the now known corona anemometers. It is known that when the potential applied to the point of the corona discharge anemometer is negative, the nature of the discharge is such that it is pulsed, and for a given set of conditions, the pulses occur with great regularity. Further, each pulse carries the same quantity of charge, and the pulse repetition frequency (PRF) rate is determined by the potential or field distribution in the vicinity of the point. The pulses are often referred to as Trichel pulses, after G. W. Trichel, an early investigator of the phenomenon. For a discussion of the pulsed nature of the discharge and the effect of wind speed on discharge current, see J. Alan Chalmers, *Atmospheric Electricity* (2nd ed., Pergamon Press, 1967), pp 241, 251–252.

If there is no flowing gas (e.g., wind) in the region of the discharge point, only the electric field removes the space charge generated by a Trichel pulse, thus permitting a succeeding pulse to occur. A flowing gas, however, also removes space charge. The present invention relies upon the fact that the variations in pulse rate and, consequently, in current are caused by removal of space charge within a very small region close to the point, which in turn results in very rapid response to fluctuations in wind or gas velocity. The improvement further relies upon the realization that the PRF changes in a manner dependent upon the speed of gas flow (e.g., wind speed) and that changes in discharge current are in fact the result of variations in the PRF, and therefore the PRF is a more fundamental measurement of variation of velocity than is current variation.

The corona current as measured by a conventional microammeter is the total charge passing divided by the period involved; the response is such that only an effective average over a long time period is obtained. On the other hand, the almost instantaneous current is the charge (constant) per Trichel pulse divided by the time separation between pulses; this is exactly equivalent to the product of charge per pulse and PRF. Thus, the PRF is highly responsive to rapid velocity changes.

It is often of particular importance to detect the velocity variations associated with changes from laminar to turbulent flow and then to assess the degree of turbulence. The rapid response afforded by the present invention provides a way to detect such velocity variations.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing.

BRIEF DESCRIPTION OF DRAWING

FIG. 1 is a schematic diagram illustrating an arrangement for carrying out the invention.

DESCRIPTION OF PREFERRED EMBODIMENT

The invention finds a major use in measuring rapid fluctuations in wind velocity and, therefore, is described primarily in this context, but the use is in no way limited to this application.

A means of determining wind velocity and measuring, essentially instantaneously, variations in wind velocity by generating Trichel pulses and monitoring the repetition frequency of the pulses is illustrated in the single FIGURE of the drawing. The corona discharge pulses are generated between the point electrode 10 and conductive plane 12 by applying a high voltage unidirectional potential from a high voltage direct current generator 14 in such a manner that the point electrode 10 is negative relative to the conductive plane 12. This is accomplished by connecting the positive (plus) terminal 16 directly to the conductive plane 12 by means of conductive lead 18 and the negative (minus) terminal 20 of the generator 14 to the conductive corona discharge point 10 through conductive leads 22, 24 and 26.

Conductive points 10 which have been successfully utilized in generating the Trichel pulses are conical spikes made of unalloyed steel with a typical radius of 0.088 millimeter, fine wires (silver plated copper wire) snipped to give points of 0.044 millimeter radius, and surgical needles of stainless steel (iron-nickel alloy) with a radius of 0.038 millimeter. The pulse discharge is obtained for a wide range of distances (d) between the point electrode 10 and conductive plane 12 and applied voltages, as explained in the literature previously cited.

The presence of the conductive plane is not essential for the production of pulses. Even if it is removed ($d$ effectively infinity), pulses still occur provided the point is at a strong negative potential with respect to the ambient atmosphere. Thus, if an isolated point is elevated above the earth's surface and a negative potential applied between the point and ground, Trichel pulses occur and can be used to measure surface winds and their fluctuations. Often, however, the conductive plane is desirable or necessary, as when flow is measured within a large pipe.

Typically, then, a separation $d$ of 3.45 centimeters and a voltage differential of 20 kilovolts have been found to be satisfactory and to produce a discharge with a PRF of 20 kilocycles per second with no wind applied between. As long as there is no wind, only the electric field removes the space charge and the PRF is constant and is determined by the potential distribution between the discharge point 10 and plane 12. When wind is applied, however, it also moves the space charge, and the PRF increases in a manner dependent upon the wind speed and, further, changes very rapidly, since changes are dependent upon removal of the space charge within a very small region close to the point.

For the same applied potential and wind conditions, the PRF is controlled by the characteristics of the point, especially sharpness. A factor of ten change in PRF can be accomplished by changing point characteristics. With the typical arrangement discussed above, however, a PRF of about 20 kilohertz will occur for zero wind speed; this increases slowly at first with increasing wind velocity and then linearly for speeds exceeding 2 meters per second. Thus, at 20 meters per second the PRF is about 200 kilohertz. The upper limit of measurability is probably at a PRF around 1 megahertz, corresponding to a very high wind speed. At 20 meters per second and a PRF of 200 kilohertz pulses are separated by 5 microseconds; since times down to far less than 1 microsecond are easily measurable, even very transient gustiness can be detected.

In order to measure the average discharge current and hence obtain one measure of wind velocity, a microammeter 28 is connected in series (in conductor 26) with discharge point 10. The measurement of the average current, as previously explained, does not constitute a part of this invention. It does not provide as accurate a measurement of the changes in wind velocity as does the measurement of changes in PRF.

Since, under a given set of conditions, the applied voltage is determinitive of PRF, a volt meter 30 is connected directly across the terminals 16 and 20 of the generator 14 in order to provide a means for monitoring the applied voltage.

The pulses which occur are monitored by connecting a resistor 32 in line with the discharge point 10 and between the point and ground to generate a voltage having the same PRF as that appearing between point 10 and plane 12. A conventional oscilloscope 34 is connected by leads 36 and 38 to receive the voltage which appears across the resistor 32 so that the pulses are displayed on the oscilloscope tube. Thus, the PRF and variations in the PRF are displayed in such manner that they are readily measured, and hence the velocity of the wind and variations in velocity of the wind passing between the discharge point 10 and plane 12 can easily be measured. As an aid in making the measurements as well as obtaining a permanent record, a moving picture is taken of the oscilloscope display by means of a moving film camera 40. The film from the camera 40 then also offers a way accurately to measure the PRF and hence wind velocity. Alternatively, various electronic devices are available for direct PRF measurement; the PRF can also be monitored aurally, either immediately via a loudspeaker or after magnetic tape recording.

Thus, it is seen that the objects of the invention are carried out by using simple, inexpensive and readily available equipment. While a particular means of carrying out the invention is illustrated and decribed, other means are available and the invention is not to be limited by the expedients illustrated and described, nor is it to be limited to measurement of the velocity of a particular gaseous material. It is contemplated that the appended claims will cover any modifications that may fall within the true spirit and scope of the invention.

What is claimed is:

1. The method of determining variations is the velocity of a gas, which method includes applying an uninterrupted unidirectional negative potential to a point electrode, thereby generating a continuing series of ionization pulse discharges; subjecting the said pulse discharges to the flow of gas, thus determining the frequency of repetition of the said pulse discharges in accordance with the velocity of said gas and variations in the frequency of the said pulse discharges in accordance with variations in the velocity of the said gas; and determining the variations in the pulse repetition frequency rate, thereby to determine variations in the velocity of the gas.

2. The method of measuring the velocity of a gas incorporating the method defined in claim 1 and including correlating the velocity of the gas and pulse repetition frequency, thereby providing an accurate indication of the velocity of the gas by the said step of determining the variations in the pulse repetition frequency rate.

* * * * *